(12) United States Patent
Salter et al.

(10) Patent No.: US 12,122,256 B2
(45) Date of Patent: Oct. 22, 2024

(54) SYSTEMS AND METHODS FOR PROVIDING PASSTHROUGH CHARGING SUPPORT DURING BIDIRECTIONAL ENERGY TRANSFERS

(71) Applicant: FORD GLOBAL TECHNOLOGIES, LLC, Dearborn, MI (US)

(72) Inventors: Stuart C. Salter, White Lake, MI (US); Peter Phung, Windsor (CA); Ryan O'Gorman, Beverly Hills, MI (US); Katherine Howard-Cone, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 290 days.

(21) Appl. No.: 17/393,579

(22) Filed: Aug. 4, 2021

(65) Prior Publication Data
US 2023/0038656 A1    Feb. 9, 2023

(51) Int. Cl.
| | |
|---|---|
| *B60L 53/62* | (2019.01) |
| *B60L 53/16* | (2019.01) |
| *B60L 53/18* | (2019.01) |
| *B60L 53/30* | (2019.01) |
| *H02J 7/00* | (2006.01) |
| *H02J 7/34* | (2006.01) |
| *B60L 50/60* | (2019.01) |

(52) U.S. Cl.
CPC .............. *B60L 53/62* (2019.02); *B60L 53/16* (2019.02); *B60L 53/18* (2019.02); *B60L 53/305* (2019.02); *H02J 7/0045* (2013.01); *H02J 7/00712* (2020.01); *H02J 7/342* (2020.01); *B60L 50/60* (2019.02); *H02J 7/0014* (2013.01)

(58) Field of Classification Search
CPC .......... B60L 53/16; B60L 53/18; B60L 53/62; B60L 53/305; B60L 50/60; H02J 7/0014; H02J 7/0045; H02J 7/00712; H02J 7/342
USPC ........................................ 320/103, 104, 109
See application file for complete search history.

(56) References Cited

U.S. PATENT DOCUMENTS

| | | | |
|---|---|---|---|
| 9,156,322 | B2 | 10/2015 | Kanaori et al. |
| 11,001,161 | B2* | 5/2021 | Rosene ................... B60L 53/66 |
| 2012/0303397 | A1* | 11/2012 | Prosser ................... B60L 53/18 |
| | | | 705/7.12 |

(Continued)

FOREIGN PATENT DOCUMENTS

| | | |
|---|---|---|
| CN | 107798778 A | 3/2018 |
| EP | 2737596 B1 | 9/2019 |

(Continued)

*Primary Examiner* — Edward Tso
*Assistant Examiner* — Aaron Piggush
(74) *Attorney, Agent, or Firm* — David B. Kelley; Carlson, Gaskey & Olds, P.C.

(57) ABSTRACT

Systems and methods are configured for coordinating and providing passthrough charging during bidirectional energy transfer events between two or more electrified vehicles. The ability to pass charging power from one vehicle to another allows for multiple vehicles to be concurrently charged from a single charge source. Various passthrough charging strategies may be achieved with the proposed systems, including but not limited to, a distributed charging strategy, a waterfall charging strategy, a targeted charging strategy, an automated charging strategy, a pay-for-use charging strategy, etc.

20 Claims, 8 Drawing Sheets

(56) References Cited

U.S. PATENT DOCUMENTS

| | | | |
|---|---|---|---|
| 2014/0179164 A1* | 6/2014 | Kanamori | B60L 53/65 |
| | | | 439/620.21 |
| 2017/0355271 A1 | 12/2017 | Cronie | |
| 2018/0201148 A1 | 7/2018 | Donnelly et al. | |
| 2020/0231057 A1* | 7/2020 | Hishida | H02J 13/00006 |
| 2020/0324665 A1* | 10/2020 | Mackenzie | B60L 53/16 |
| 2021/0155104 A1* | 5/2021 | Skutt | B60L 53/302 |
| 2022/0379743 A1* | 12/2022 | Salter | B60L 53/57 |
| 2022/0379767 A1* | 12/2022 | Salter | B60L 53/62 |
| 2023/0108029 A1* | 4/2023 | Salter | B60K 1/04 |
| | | | 320/109 |
| 2023/0234458 A1* | 7/2023 | Salter | B60L 53/14 |
| | | | 320/109 |

FOREIGN PATENT DOCUMENTS

| | | | |
|---|---|---|---|
| JP | 2008312401 A | 12/2008 | |
| JP | 2009225638 A | 10/2009 | |
| JP | 5081780 B2 | 11/2012 | |

* cited by examiner

SYSTEMS AND METHODS FOR PROVIDING PASSTHROUGH CHARGING SUPPORT DURING BIDIRECTIONAL ENERGY TRANSFERS

TECHNICAL FIELD

This disclosure relates generally to systems and methods for concurrently charging multiple vehicles from a single charge source.

BACKGROUND

Electrified vehicles differ from conventional motor vehicles because they are selectively driven by one or more traction battery pack powered electric machines. The electric machines can propel the electrified vehicles instead of, or in combination with, an internal combustion engine. Plug-in type electrified vehicles include one or more charging interfaces for charging the traction battery pack. Plug-in type electrified vehicles are commonly charged while parked at a charging station or some other utility power source. Typically, charging stations are only capable of charging one vehicle at a time.

SUMMARY

A bidirectional energy transfer system according to an exemplary aspect of the present disclosure includes, among other things, a host vehicle including a first traction battery pack and a surrogate vehicle including a second traction battery pack. The surrogate vehicle is operably connected to the host vehicle by a charging cable. A control module is configured to command that a first amount of charge energy received from a charge source be delivered for charging the first traction battery pack and a second amount of the charge energy be delivered for charging the second traction battery pack during a bidirectional energy transfer event.

In a further non-limiting embodiment of the foregoing system, the second amount of the charge energy provides passthrough charging support for charging the surrogate vehicle from the charge source without a direct connection of the surrogate vehicle to the charge source.

In a further non-limiting embodiment of either of the foregoing systems, the control module is configured to interface with a bidirectional power transfer system of at least one of the host vehicle or the surrogate vehicle for controlling a transfer of the first amount of the charge energy and the second amount of the charge energy.

In a further non-limiting embodiment of any of the foregoing systems, the control module is further configured to communicate a passthrough charging signal for controlling the bidirectional power transfer system to provide the first amount and the second amount during the transfer.

In a further non-limiting embodiment of any of the foregoing systems, the control module is a component of the host vehicle.

In a further non-limiting embodiment of any of the foregoing systems, a human machine interface or a personal electronic device is associated with the host vehicle. The human machine interface, the personal electronic device, or both is configured through a cloud-based application to provide a user interface for selecting a passthrough charging configuration that defines the first amount and the second amount of the charge energy.

In a further non-limiting embodiment of any of the foregoing systems, the passthrough charging configuration includes a distributed passthrough charging configuration, a waterfall passthrough charging configuration, a targeted passthrough charging configuration, an automated passthrough charging configuration, or a pay-for-use passthrough charging configuration.

In a further non-limiting embodiment of any of the foregoing systems, the first amount of the charge energy is zero and the second amount of the charge energy is an amount greater than zero.

In a further non-limiting embodiment of any of the foregoing systems, the host vehicle includes a first charge port assembly operably connected to the charge source and a second charge port assembly operably connected to the charging cable.

In a further non-limiting embodiment of any of the foregoing systems, the host vehicle includes a charging splitter adapter operably connected to both the charge source and the charging cable.

An electrified vehicle according to another exemplary aspect of the present disclosure includes, among other things, a traction battery pack, a bidirectional power transfer system operably connected to the traction battery pack, and a control module programmed to control the bidirectional power transfer system to provide passthrough charging support for charging a device separate from the electrified vehicle during a bidirectional energy transfer event.

In a further non-limiting embodiment of the foregoing electrified vehicle, a telecommunications module is configured for establishing bidirectional communications between the electrified vehicle and a second electrified vehicle.

In a further non-limiting embodiment of either of the foregoing electrified vehicle system, the system includes a human machine interface or a personal electronic device. The human machine interface, the personal electronic device, or both is configured through a cloud-based application to provide a user interface for selecting a passthrough charging configuration for achieving the passthrough charging support.

In a further non-limiting embodiment of any of the foregoing vehicle systems, the passthrough charging configuration includes a distributed passthrough charging configuration, a waterfall passthrough charging configuration, a targeted passthrough charging configuration, an automated passthrough charging configuration, or a pay-for-use passthrough charging configuration.

In a further non-limiting embodiment of any of the foregoing vehicle systems, the user interface is configured to allow a user to enter a specific amount of charge energy or a desired passthrough charging schedule or target to be transferred during the bidirectional energy transfer event.

In a further non-limiting embodiment of any of the foregoing vehicle systems, the control module is programmed to command that a first amount of charge energy received from a charge source be delivered for charging the traction battery pack and a second amount of the charge energy be delivered for charging the device during the bidirectional energy transfer event.

In a further non-limiting embodiment of any of the foregoing vehicle systems, the device is a second traction battery pack of a second electrified vehicle, and the second amount provides the passthrough charging support.

In a further non-limiting embodiment of any of the foregoing vehicle systems, the electrified vehicle and the second electrified vehicle are operably connected to one another by a charging cable.

In a further non-limiting embodiment of any of the foregoing vehicle systems, a first charge port assembly and a second charge port assembly are operably connected to the bidirectional power transfer system.

In a further non-limiting embodiment of any of the foregoing vehicle systems, a first charging cord is connected to the first charge port assembly and a second charging cord is connected to the second charge port assembly.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure relates to systems and methods for coordinating and providing passthrough charging during bidirectional energy transfer events between two or more electrified vehicles. The ability to pass charging power from one vehicle to another allows for multiple vehicles to be concurrently charged from a single charge source. Various passthrough charging strategies may be achieved with the proposed systems, including but not limited to, a distributed charging strategy, a waterfall charging strategy, a targeted charging strategy, an automated charging strategy, a pay-for-use charging strategy, etc. These and other features of this disclosure are discussed in greater detail in the following paragraphs of this detailed description.

Figure 1:
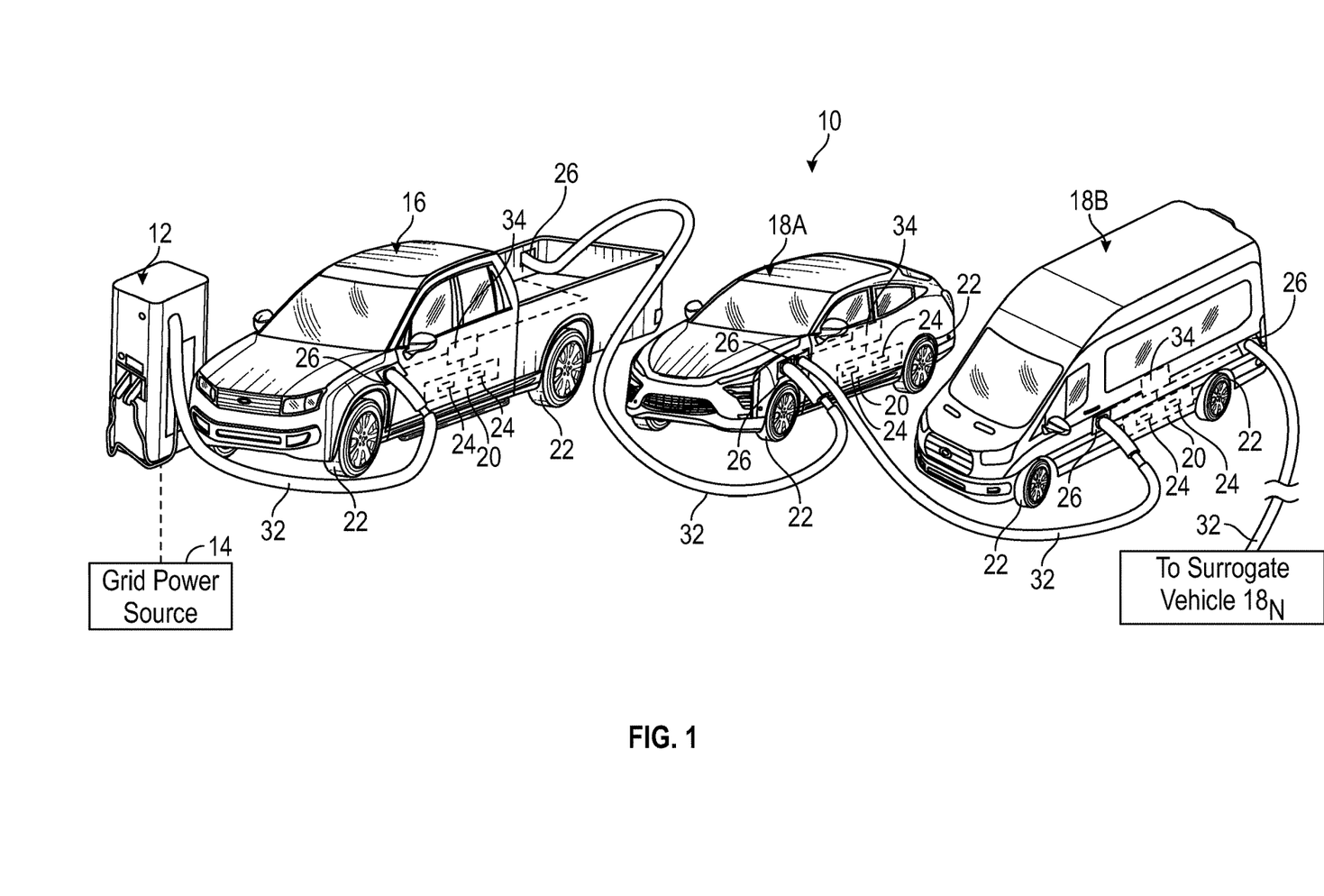
FIG. 1 schematically illustrates a bidirectional energy transfer system configured for charging multiple vehicles from a single charge source.

FIG. 1 schematically illustrates an exemplary bidirectional energy transfer system 10 (hereinafter "the system 10") for bidirectionally transferring energy between multiple electrified vehicles. In particular, the system 10 may be utilized to charge multiple vehicles from a single charge source 12 by employing passthrough charging techniques. In this disclosure, the term "passthrough charging" indicates the ability of a vehicle to transfer all or a portion of the power received from a charge source to another vehicle for addressing that vehicle's charging needs without the other vehicle being directly connected to the primary charge source.

The charge source 12 may be a public charging station, a DC fast charging station, a home charging station, a wall outlet, or any other type of charge source. The charge source 12 may be operably coupled to a grid power source 14 (e.g., AC power, solar power, wind power, or combinations thereof). The charge source 12 may therefore provide the interface for charging the one or more electrified vehicles using power supplied by the grid power source 14.

In an embodiment, a donor or host vehicle 16 is operably connected to the charge source 12, and one or more participating or surrogate vehicles $18_A$ to $18_N$, where "N" represents any number, may be operably connected in series to the host vehicle 16. The system 10 enables the bidirectional transfer of energy from the charge source 12, to the host vehicle 16, and then to the one or more surrogate vehicles 18 by providing passthrough charging. Unless stated otherwise herein, reference numeral "18" may refer to any of the surrogate vehicles when used without any alphabetic identifier immediately following the reference numeral.

In an embodiment, the host vehicle 16 and the surrogate vehicles 18 are plug-in type electrified vehicles (e.g., plug-in hybrid electric vehicles (PHEVs) or battery electric vehicles (BEV)). The host vehicle 16 and the surrogate vehicles 18 may each include a traction battery pack 20 that is part of an electrified powertrain capable of applying torque from an electric machine (e.g., an electric motor) for driving respective drive wheels 22 of each vehicle. Therefore, the powertrain of each vehicle associated with the system 10 may electrically propel the respective set of drive wheels 22 either with or without the assistance of an internal combustion engine.

In the illustrated embodiment, the host vehicle 16 is schematically illustrated as a pickup truck, the surrogate vehicle $16_A$ is schematically illustrated as a sedan-style car, and the surrogate vehicle $16_B$ is schematically illustrated as a van. However, other vehicle configurations are also contemplated within the scope of this disclosure. The teachings of this disclosure should therefore be understood to be applicable for any type of vehicle as the host vehicle 16 and for any type of vehicle as each of the surrogate vehicles 18. For example, the vehicles associated with the system 10 could include any combination of cars, trucks, vans, sport utility vehicles (SUVs), etc.

Although a specific component relationship is illustrated in the figures of this disclosure, the illustrations are not intended to limit this disclosure. The placement and orientation of the various components of the depicted vehicles are shown schematically and could vary within the scope of this disclosure. In addition, the various figures accompanying this disclosure are not necessarily drawn to scale, and some features may be exaggerated or minimized to emphasize certain details of a particular component.

Although shown schematically, each traction battery pack 20 may be configured as a high voltage traction battery pack that includes a plurality of battery arrays 24 (e.g., battery assemblies or groupings of battery cells) capable of outputting electrical power to one or more electric machines. Other types of energy storage devices and/or output devices may also be used to electrically power the vehicles 16, 18 associated with the system 10.

From time to time, charging the energy storage devices of the traction battery pack 20 of each vehicle 16, 18 may be required or desirable. Each vehicle 16, 18 may therefore be equipped with a charging system that includes one or more charge port assemblies 26. In an embodiment, each vehicle 16, 18 participating as part of the system 10 includes at least two charge port assemblies 26 such that each vehicle may be configured to both receive charge energy from either an upstream charge source or vehicle and transfer charge energy to one or more downstream vehicles. In another embodiment, one or more of the vehicles 16, 18 may utilize a charging splitter adapter 28 that may be plugged into one of the charge port assemblies 26 and includes multiple ports 30 adapted for connecting multiple charging cables 32 to the vehicle during bidirectional energy transfer events (see, e.g., FIG. 2).

The exact positioning of the charge port assemblies 26 shown in FIG. 1 is exemplary only and is not intended to limit this disclosure. Each charge port assembly 26 could be located at any accessible location (e.g., front exterior, rear exterior, truck bed or other cargo space locations, etc.) of each vehicle 16, 18.

A plurality of charging cables 32 may be used to operably connect the vehicles of the system 10 to the charge source 12 for charging. The charging cables 32 may be arranged in a daisy-chain configuration for achieving passthrough charging during the bidirectional energy transfer events. For example, a first charging cable 32 may be operably connected between the charge source 12 and the first charge port assembly 26 of the host vehicle 16, a second charging cable 32 may be operably connected between the second charge port assembly 26 of the host vehicle 16 and the first charge port assembly 26 of the surrogate vehicle $18_A$, a third charging cable 32 may be operably connected between the second charge port assembly 26 of the surrogate vehicle $18_A$ and the first charge port assembly 26 of the surrogate vehicle 18B, and so on. The charging cables 32 may be configured to provide any level of charging (e.g., Level 1 AC charging, Level 2 AC charging, DC charging, etc.).

The respective charging systems of the vehicles 16, 18 may additionally include a bidirectional power transfer system 34 configured for enabling the bidirectional transfer of power to/from each respective vehicle. The bidirectional power transfer system 34 may further control the amount of charge energy that is passed through to downstream surrogate vehicles when providing the passthrough charging support. The bidirectional power transfer system 34 may be operably connected between the charge port assemblies 26 and the traction battery pack 20 of each of vehicle. The bidirectional power transfer system 34 may include various equipment, such as a charger, a converter, a motor controller (which may be referred to as an inverter system controller or ISC), contactors, relays, etc., arranged and configured to establish the bidirectional transfer of electrical energy between the respective participating vehicles of the system 10. The bidirectional power transfer systems 34 may additionally be configured to transfer energy between the traction battery packs 20 and the electric machines of each respective vehicle.

One non-limiting example of a suitable bidirectional power transfer system that may be employed for use within the host vehicle 16 and the surrogate vehicles 18 for achieving bidirectional power transfers is disclosed within US Patent Publication No. 2020/0324665, assigned to Ford Global Technologies, LLC, the disclosure of which is incorporated by reference herein. However, other bidirectional power transfer systems could also be utilized for achieving bidirectional transfers of power within the scope of this disclosure.

Figure 3:
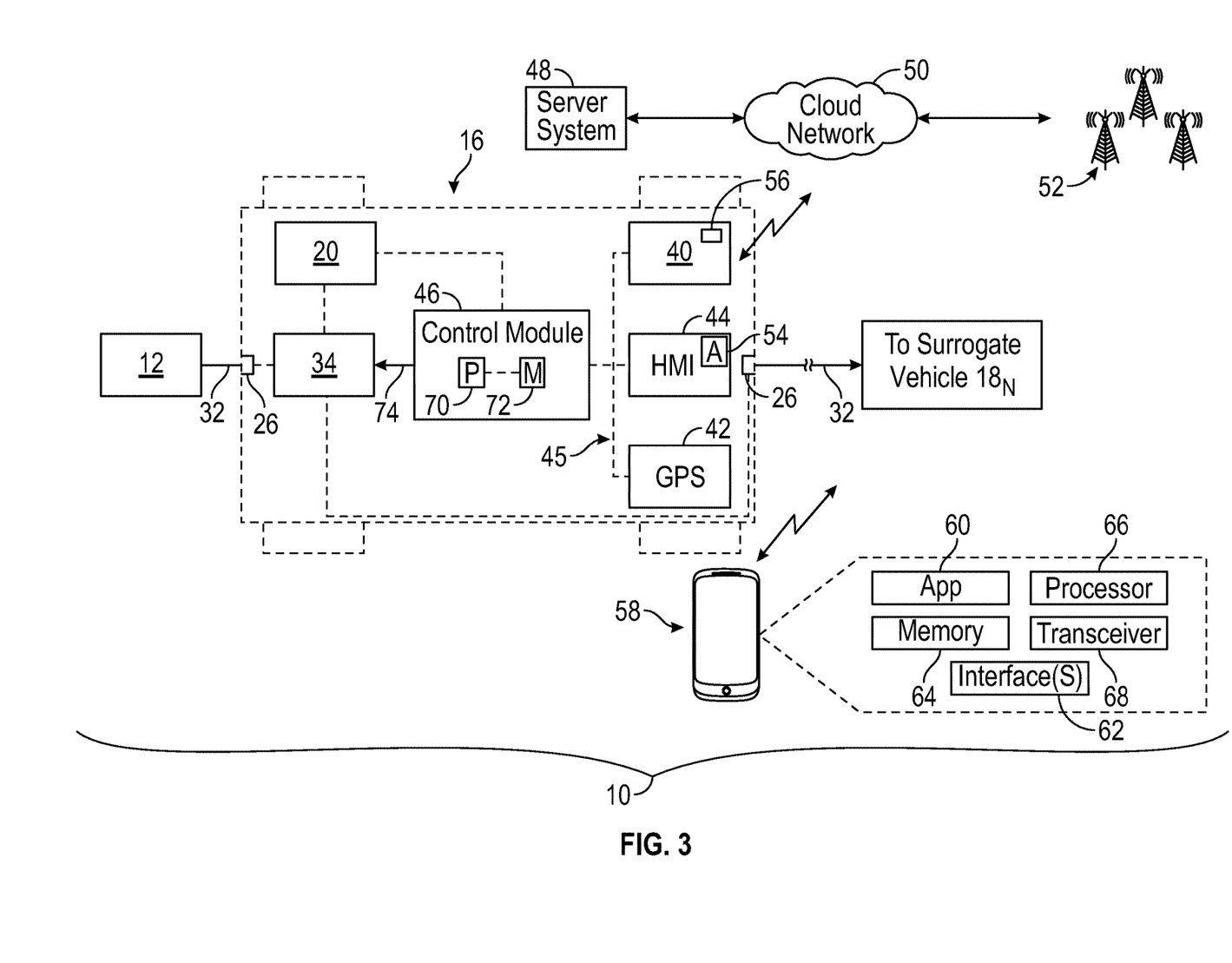
FIG. 3 schematically illustrates exemplary aspects of a bidirectional energy transfer system from the perspective of a host/donor/requesting vehicle.

Additional aspects of the system 10 of FIG. 1 are further detailed from the perspective of the host vehicle 16 in FIG. 3. In particular, FIG. 3 schematically illustrates features that enable the system 10 to coordinate passthrough charging between the host vehicle 16 and the one or more surrogate vehicles 18 from the single charge source 12 during bidirectional energy transfer events. Each surrogate vehicle $18_A$-$18_N$ could include similar features as those of the host vehicle 16 for enabling the system 10 to coordinate and provide the passthrough charging support.

As further part of the system 10, the host vehicle 16 may include at least a telecommunications module 40, a global positioning system (GPS) 42, a human machine interface (HMI) 44, and a control module 46. These and other components may be interconnected and in electronic communication with one another over a communication bus 45 of the host vehicle 16. The communication bus 45 may be a wired communication bus such as a controller area network (CAN) bus, or a wireless communication bus such as Wi-Fi, Bluetooth®, Ultra-Wide Band (UWB), etc.

The telecommunications module 40 may be configured for achieving bidirectional communications with a cloud-based server system 48. The telecommunications module 40 may communicate over a cloud network 50 (e.g., the internet) to obtain various information stored on the server system 48 or to provide information to the server system 48 that can subsequently be accessed by the host vehicle 16 (and/or each participating surrogate vehicle 18 of the system 10). The server system 48 can identify, collect, and store user data associated with the host vehicle 16 for validation purposes. Upon an authorized request, data may be subsequently transmitted to the telecommunications module 40 via one or more cellular towers 52 or some other known communication technique (e.g., Wi-Fi, Bluetooth®, data connectivity, etc.). The telecommunications module 40 can receive data from the server system 48 or can communicate data back to the server system 48 via the cellular tower(s) 52. Although not necessarily shown or described in this highly schematic embodiment, numerous other components may enable bidirectional communications between the host vehicle 16 and the server system 48.

The telecommunication module 40 may additionally include one or more wireless devices 56 that facilitate the detection of and communication with nearby vehicles, such as the surrogate vehicles 18, for example. Various information and signals, including charging-related information and signals, may be exchanged between the host vehicle 16 and each participating surrogate vehicle 18 via the wireless devices 56. In an embodiment, the wireless device 56 are Bluetooth® Low Energy (BLE) transceivers configured to receive and/or emit low energy signals as a way to detect and communicate with participating vehicles. However, other types of wireless devices (e.g., WiFi, V2V, etc.) are also contemplated within the scope of this disclosure for enabling bidirectional communications between the host vehicle 16 and each participating surrogate vehicle 18.

In a first embodiment, a user/owner of the host vehicle 12 may interface with the server system 48 using the HMI 44. For example, the HMI 44 may be equipped with an application 54 (e.g., FordPass™ or another similar web-based application) for interfacing with the server system 48. The HMI 44 may be located within a passenger cabin of the host vehicle 16 and may include various user interfaces for displaying information to the vehicle occupants and for allowing the vehicle occupants to enter information into the HMI 44. The vehicle occupants may interact with the user interfaces presentable on the HMI 44 via touch screens, tactile buttons, audible speech, speech synthesis, etc.

In another embodiment, the user/owner of the host vehicle 16 could alternatively or additionally interface with the server system 48, such as for coordinating passthrough charging during bidirectional energy transfer events, using a personal electronic device 58 (e.g., a smart phone, tablet, computer, wearable smart device, etc.). The personal electronic device 58 may include an application 60 (e.g., FordPass™ or another similar application) that includes programming to allow the user to employ one or more user interfaces 62 for setting or controlling certain passthrough charging aspects of the system 10. The application 60 may be stored in a memory 64 of the personal electronic device 58 and may be executed by a processor 66 of the personal electronic device 58. The personal electronic device 58 may additionally include a transceiver 68 that is configured to communicate with the server system 48 over the cellular tower(s) 52 or some other wireless link.

The GPS 42 is configured to pinpoint locational coordinates of the host vehicle 16. The GPS 42 may utilize geopositioning techniques or any other satellite navigation techniques for estimating the geographic position of the host vehicle 16 at any point in time. The GPS 42 may further identify locations of nearby charge sources and nearby surrogate vehicles 18. The GPS 42 may further store information related to the most often traveled to destinations of the host vehicle 16, trip planner information, etc.

The control module 46 may include both hardware and software and could be part of an overall vehicle control system, such as a vehicle system controller (VSC), or could alternatively be a stand-alone controller separate from the VSC. In an embodiment, the control module 46 is programmed with executable instructions for interfacing with and commanding operation of various components of the system 10. Although shown as separate modules within the highly schematic depiction of FIG. 3, the telecommunications module 40, the GPS 42, the HMI 44, and the control module 46 could be integrated together as part of common module of the host vehicle 16.

The control module 46 may include a processor 70 and non-transitory memory 72 for executing various control strategies and modes associated with the system 10. The processor 70 can be a custom made or commercially available processor, a central processing unit (CPU), or generally any device for executing software instructions. The memory 72 can include any one or combination of volatile memory elements and/or nonvolatile memory elements.

The processor 70 may be operably coupled to the memory 72 and may be configured to execute one or more programs stored in the memory 72 of the control module 46 based on the various inputs received from other devices, such as the server system 48, the telecommunications module 40, the GPS 42, the HMI 44, the traction battery pack 20, the bidirectional power transfer system 34, etc. In an embodiment, the application 54 (e.g., FordPass™ or another similar application), which includes programming for allowing the vehicle user to employ one or more user interfaces within the HMI 44 for setting or controlling certain aspects of the system 10, may be stored in the memory 72 and may be executed by the processor 70 of the control module 46. Alternatively, the control module 46 may be configured to communicate and interface with the personal electronic device 58 for coordinating and/or executing certain aspects of the system 10.

The control module 46 may receive and process various inputs for coordinating and providing passthrough charging support during bidirectional energy transfers. In an embodiment, based on various inputs received from the charge port assemblies 26, the telecommunications module 40, the traction battery pack 20, and the HMI 44 and/or the personal electronic device 58, the control module 46 may begin coordinating the functions necessary for providing the passthrough charging for passing charge energy from the charge source 12 to one or more of the surrogate vehicles 18.

A first input to the control module 46 may include a plug connection status signal from one or more of the charge port assemblies 26. The plug connection status signal may indicate whether or not the host vehicle 16 is "on-plug" (e.g., whether or not the charging cable 32 from the charge source 12 is currently plugged into the charge port assembly 26).

Another input to the control module 46 may include a charging status of the host vehicle 16. The charging status may include information pertaining to a total energy transfer status (e.g., available transfer rate of "X" amount of kilowatt hours, etc.) of the host vehicle 16.

Another input to the control module 46 may include battery-related data received from the traction battery pack 20 of the host vehicle 16. The battery-related data may include information such as battery state of charge and/or available travel range, charge rate levels, charge acceptance levels, battery aging information, etc. Similar battery-related data may also be received from each of the participating surrogate vehicles 18.

Another input to the control module 46 may include signals from the telecommunications module 40. The signals may indicate, for example, that the host vehicle 16 has established communications with one or more surrogate vehicles 18 that desire to participate in the passthrough charging bidirectional energy transfer event.

Yet another input to the control module 46 may include information related to specific passthrough charging requests made by the owner/user of the host vehicle 16 using the HMI 44 and/or the personal electronic device 58. For example, using the application 54 and/or the application 60, the user of the host vehicle 16 may select a specific passthrough charging configuration and/or allocate specific passthrough charging amounts to be provided to each surrogate vehicle 18 during the bidirectional energy transfer event.

The control module 46 may also be configured to command that one or more prompts/instructions be communicated to the user/owner of host vehicle 16 for coordinating the passthrough charging support. The prompts/instructions may be displayed as one or more messages on the HMI 44 or the personal electronic device 58, for example, and may include instructions for setting passthrough charging allocations, for plugging the various charging cables 32 to the charge port assemblies 26 of the participating vehicles, etc.

In response to receiving and analyzing the various input signals, the control module 46 may communicate a passthrough charging signal 74 to the bidirectional power transfer system 34 of the host vehicle 16. The passthrough charging signal 74 indicates, for example, how much, if any, of the charge energy received from the charge source 12 should be communicated for charging the traction battery pack 20 of the host vehicle 16 and how much, if any, of the charge energy should be communicated for charging the traction battery pack 20 of each of the one or more participating surrogate vehicles 18. The control module 46 may therefore interface with and control the functionality of the bidirectional power transfer system 34 (e.g., by opening/closing contactors, performing step-up or step-down power conversions, performing power inversions, etc.) for coordinating and providing the passthrough charging during bidirectional energy transfer events.

In the embodiments described above, the control module 46 of the host vehicle 16 is configured to function as the communications hub of the system 10 and therefore the host vehicle essentially controls the passthrough charging support. However, other embodiments are also contemplated within the scope of this disclosure.

Figure 2:
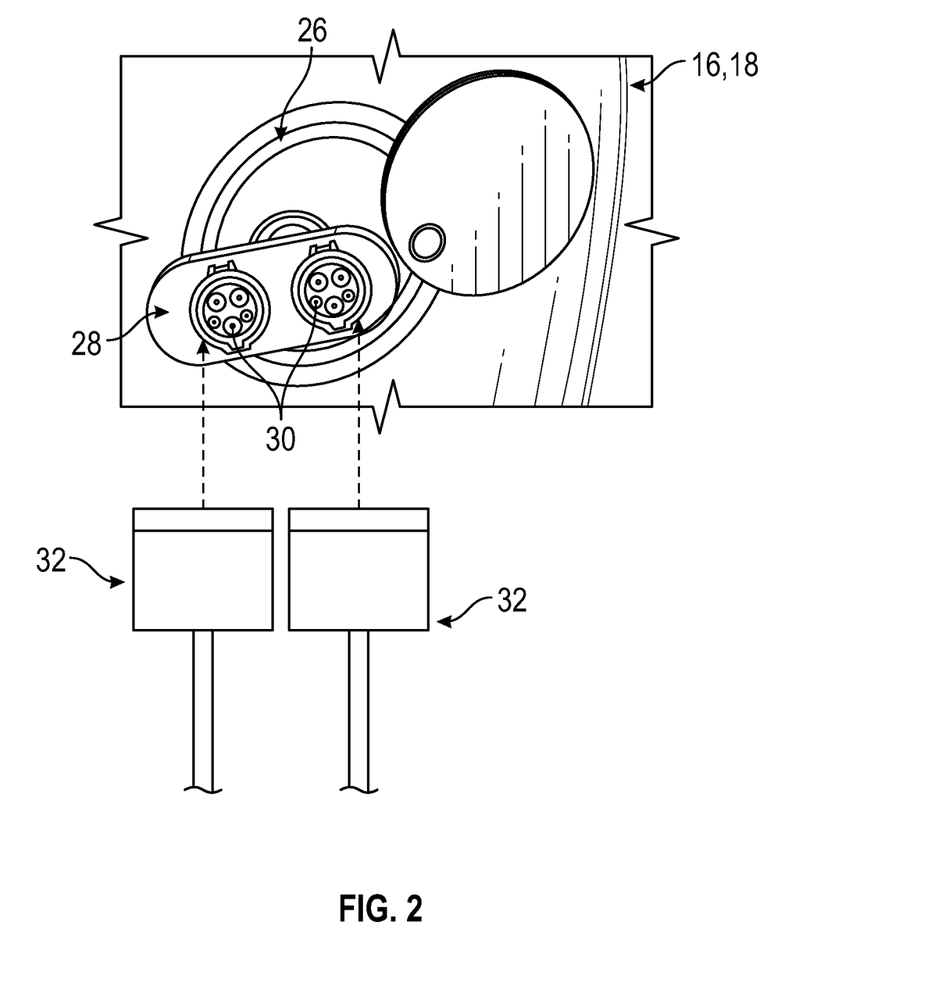
FIG. 2 schematically illustrates an exemplary charging splitter adapter for transferring passthrough charge energy within a bidirectional energy transfer system.

The system 10 of FIGS. 1-3 may be utilized to achieve various passthrough charging configurations between the host vehicle 16 and one or more participating surrogate vehicles 18 for concurrently charging multiple vehicles from the single charge source 12. Non-limiting examples of passthrough charging configurations that may be achieved by the system 10 are described below with reference to FIGS. 4-8.

Figure 4:
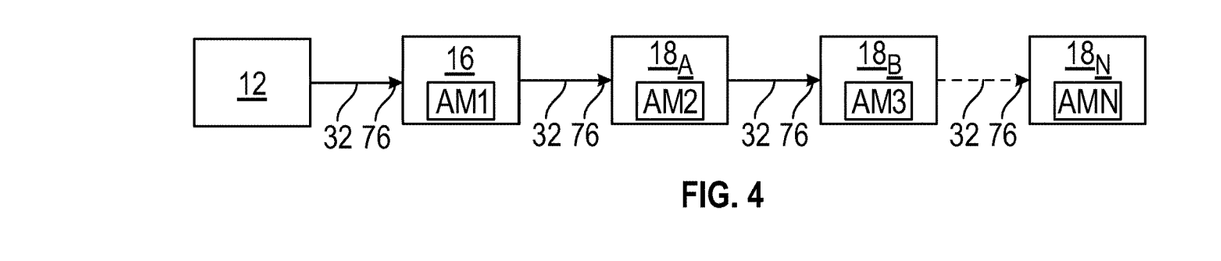
FIG. 4 schematically illustrates a first passthrough charging configuration of a bidirectional energy transfer system.

FIG. 4 schematically illustrates a first passthrough charging configuration C1 of the system 10. During the first charging configuration C1, power may be simultaneously transferred from the charge source 12 to the traction battery pack 20 of host vehicle 16 and to the traction battery packs 20 associated with the participating surrogate vehicles 18 (as schematically depicted by arrows 76). The first passthrough charging configuration C1 may be achieved using multiple charging cables 32 in order to connect the vehicles in series.

The first passthrough charging configuration C1 may be referred to as a distributed or conduit charging configuration. As part of this configuration, the user/owner of the host vehicle 16 may enter desired passthrough charging selections on a user interface that can be presented on the HMI 44, the personal electronic device 58, or both. The user may select a specific amount of charge energy (shown schematically as AM1 through AMN) to be received by each participating vehicle. In an embodiment, the specific amount of charge energy may be represented in the form of a specific passthrough charge percentage amount to be assigned to each vehicle (e.g., X % to host vehicle 16, Y % to surrogate vehicle $18_A$, Z % to surrogate vehicle 18B, and so on). In another embodiment, the specific amount of charge energy may be represented in the form of a specific energy transfer amount to be assigned to each vehicle (e.g., X amount of kilowatt hours to host vehicle 16, Y amount of kilowatt hours to surrogate vehicle $18_A$, Z amount of kilowatt hours to surrogate vehicle 18B, and so on).

Figure 5:
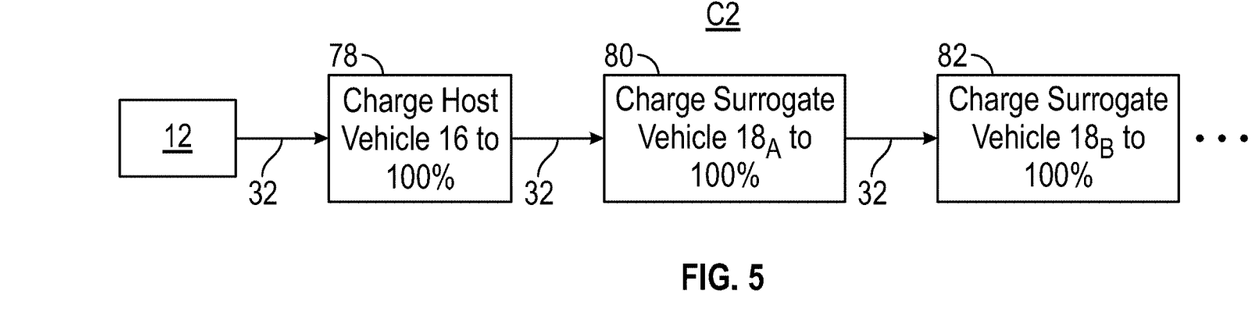
FIG. 5 schematically illustrates a second passthrough charging configuration of a bidirectional energy transfer system.

FIG. 5 schematically illustrates a second passthrough charging configuration C2 of the system 10. During the second charging configuration C2, power may be transferred from the charge source 12 to the traction battery pack 20 and then, after charging the traction battery pack 20 of the host vehicle 16 to a desired level, power may be transferred to the traction battery packs 20 associated with each downstream participating surrogate vehicle 18. The second passthrough charging configuration C2 may be achieved using multiple charging cables 32 in order to connect the vehicles in series.

The second passthrough charging configuration C2 may be referred to as a waterfall or tiered charging configuration. As part of this configuration, the host vehicle 16 may be fully charged before charging the subsequent surrogate vehicle $18_A$ in the daisy-chain. For example, as schematically depicted, the traction battery pack 20 of the host vehicle 16 may first be charged from the charge source 12 to 100% (see block 78) before beginning to charge the surrogate vehicle $18_A$. The surrogate vehicle $18_A$ may then be charged to 100% (see block 80) before beginning to charge the surrogate vehicle 18B. The surrogate vehicle 18B may then be charged to 100% (see block 82) before beginning to charge the next surrogate vehicle $18_N$, and so on. The second passthrough charging configuration C2 therefore supports a "first come, first serve" charging approach.

Figure 6:
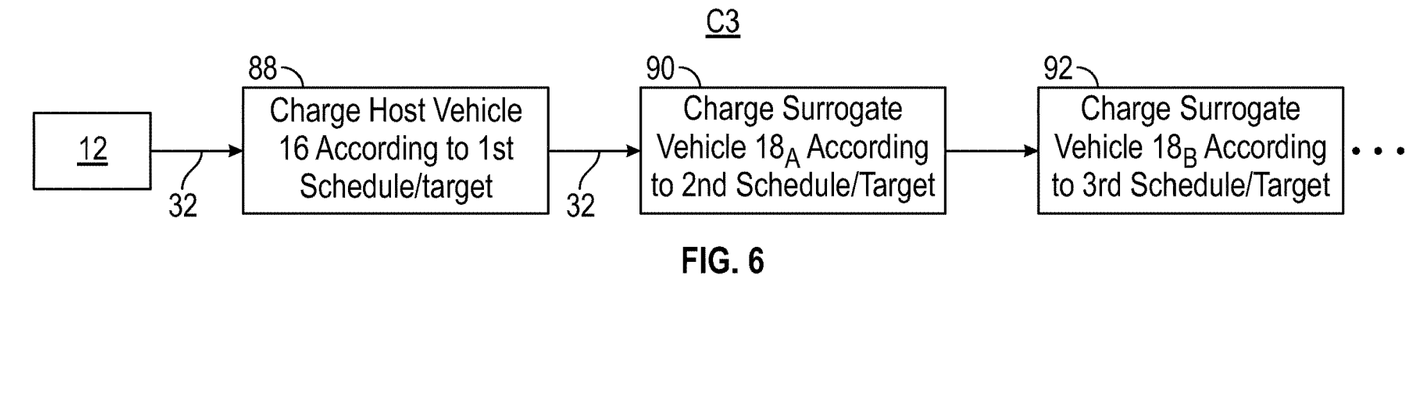
FIG. 6 schematically illustrates a third passthrough charging configuration of a bidirectional energy transfer system.

FIG. 6 schematically illustrates a third passthrough charging configuration C3 of the system 10. During the third charging configuration C3, power may be scheduled for transfer from the charge source 12 to the traction battery pack 20 of host vehicle 16 and to the traction battery packs 20 associated with each participating surrogate vehicle 18. The third passthrough charging configuration C3 may be achieved using multiple charging cables 32 in order to connect the vehicles in series.

The third passthrough charging configuration C3 may be referred to as a targeted or scheduled charging configuration. As part of this configuration, the user/owner of the host vehicle 16 may enter a desired passthrough charging schedule or passthrough charging targets on a user interface that can be presented on the HMI 44, the personal electronic device 58, or both. In an embodiment, the passthrough charging schedule includes a specific time at which the passthrough charging is to occur (e.g., at time X, charge host vehicle 16, at time Y, charge surrogate vehicle $18_A$, at time Z, charge surrogate vehicle 18B, and so on). In another embodiment, the passthrough charging schedule includes time blocks for performing the passthrough charging (e.g., charge host vehicle 16 for X amount of minutes/hours, charge surrogate vehicle $18_A$ for Y amount of minutes/hours, charge surrogate vehicle 18B for Z amount of minutes/hours, and so on). In another embodiment, the passthrough charging targets include specific SOC or range targets for completing passthrough charging for each participating vehicle (e.g., charge host vehicle 16 to X % or X number of miles of travel range, charge surrogate vehicle $18_A$ to Y % or Y number of miles of travel range, charge surrogate vehicle 18B to Z % or Z number of miles of travel range, and so on.

As schematically depicted, the traction battery pack 20 of the host vehicle 16 may first be charged according to a first schedule/target from the charge source 12 (see block 88) before beginning to charge the surrogate vehicle $18_A$. The surrogate vehicle $18_A$ may then be charged according to a second schedule/target (see block 90) before beginning to charge the surrogate vehicle 18B. The surrogate vehicle 18B may then be charged to according to a third schedule/target (see block 92) before beginning to charge the next surrogate vehicle $18_N$, and so on.

Figure 7:
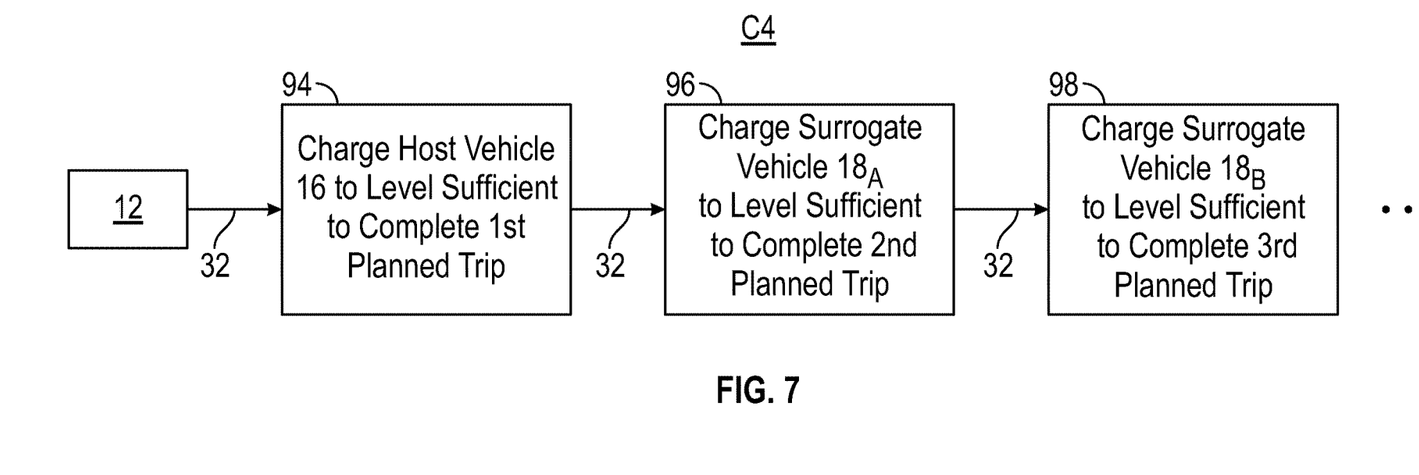
FIG. 7 schematically illustrates a fourth passthrough charging configuration of a bidirectional energy transfer system.

FIG. 7 schematically illustrates a fourth passthrough charging configuration C4 of the system 10. The fourth passthrough charging configuration C4 may be referred to as an automated or strategic balanced charging configuration. The fourth passthrough charging configuration C4 may be automatically performed by the control module 46 of the host vehicle 16 for determining a charge balance between all the vehicles connected in a daisy-chain configuration via the charging cables 32. In an embodiment, the control module 46 determines the amount of passthrough charging to provide to each participating vehicle based on trip planner information received from the GPS 42 and a current SOC of each participating vehicle.

As schematically depicted, the traction battery pack 20 of the host vehicle 16 may first be charged to a level sufficient to travel the range required to complete a first planned trip of the host vehicle 16 (see block 94) before beginning to charge the surrogate vehicle $18_A$. The surrogate vehicle $18_A$ may then be charged to a level sufficient to travel the range required to complete a second planned trip of the surrogate vehicle $18_A$ (see block 96) before beginning to charge the surrogate vehicle 18B. The surrogate vehicle 18B may then be charged to a level sufficient to travel the range required to complete a third planned trip of the surrogate vehicle 18B (see block 98) before beginning to charge the next surrogate vehicle $18_N$, and so on.

Figure 8:
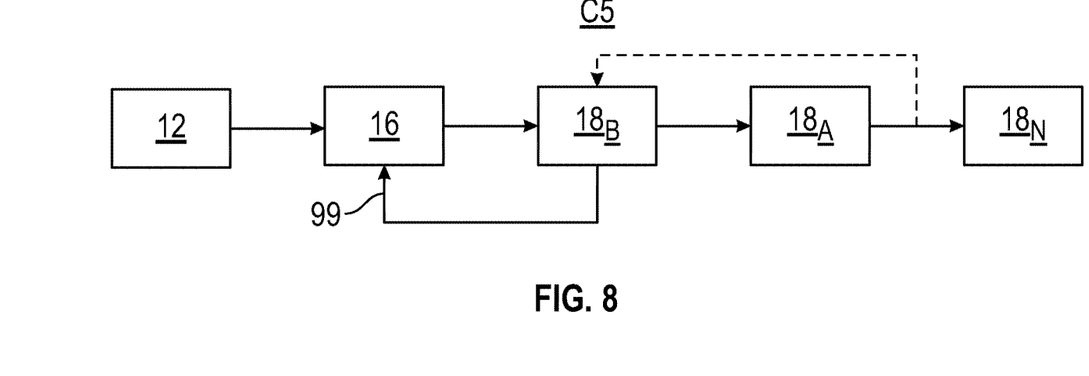
FIG. 8 schematically illustrates a fifth passthrough charging configuration of a bidirectional energy transfer system.

FIG. 8 schematically illustrates a fifth passthrough charging configuration C5 of the system 10. The fifth passthrough charging configuration C5 may be referred to as a pay-for-use charging configuration. The fifth passthrough charging configuration C5 may allow one or more surrogate vehicles to jump in line ahead of other surrogate vehicles for receiving their allotment of passthrough charging. For example, by paying a fee (shown schematically at 99) to the host vehicle 16, the surrogate vehicle 18B may jump ahead of the surrogate vehicle $18_A$ for receiving the passthrough charging. The fifth passthrough charging configuration C5 therefore supports an incentive-based business model for encouraging shared charging support during bidirectional energy transfer events.

Figure 9:
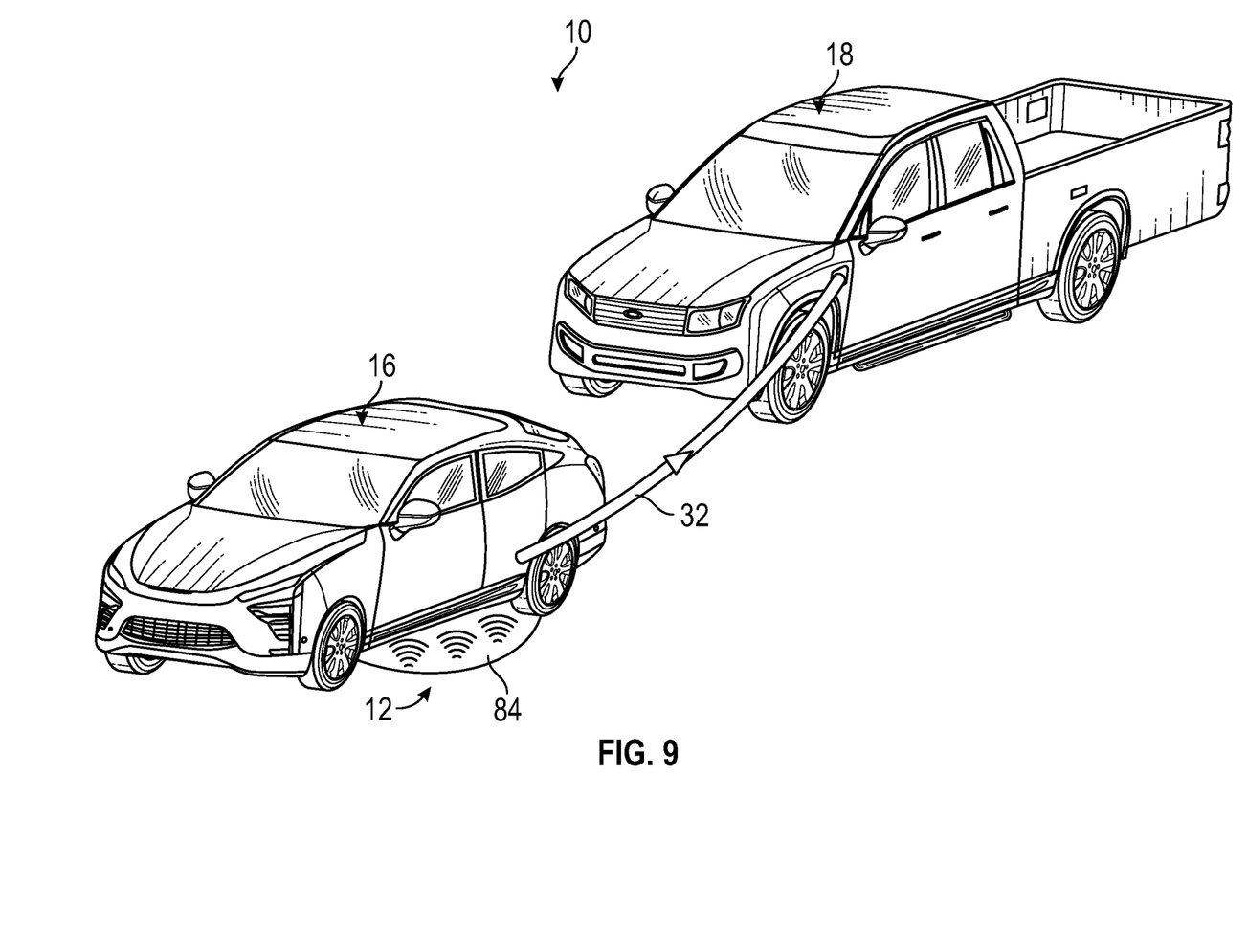
FIG. 9 schematically illustrates another configuration of an exemplary bidirectional energy transfer system.
Figure 10:
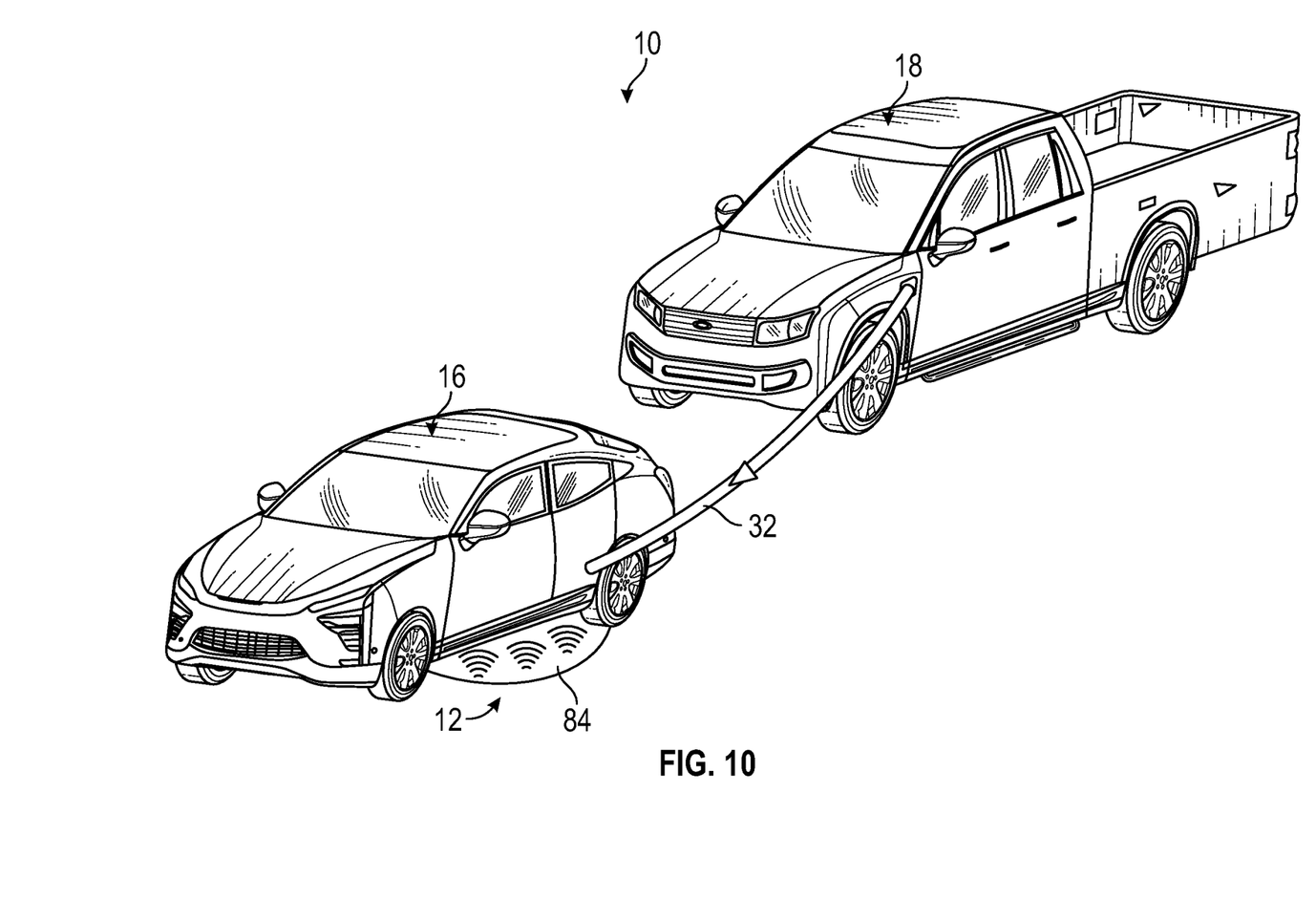
FIG. 10 illustrates yet another configuration of a bidirectional energy transfer system.

FIG. 9 illustrates an additional configuration of the system 10 in which the charge source 12 is established by a wireless charger module 84 that is configured to wirelessly transfer energy to the host vehicle 16. All or portions of the energy received from the wireless charger module 84 may be passed through to the surrogate vehicle 18 via a charging cable 32. In some embodiments, the surrogate vehicle 18 can bidirectionally charge the host vehicle 16 while the host vehicle 16 is concurrently being wirelessly charged by the wireless charger module 84 (see FIG. 10).

Figure 11:
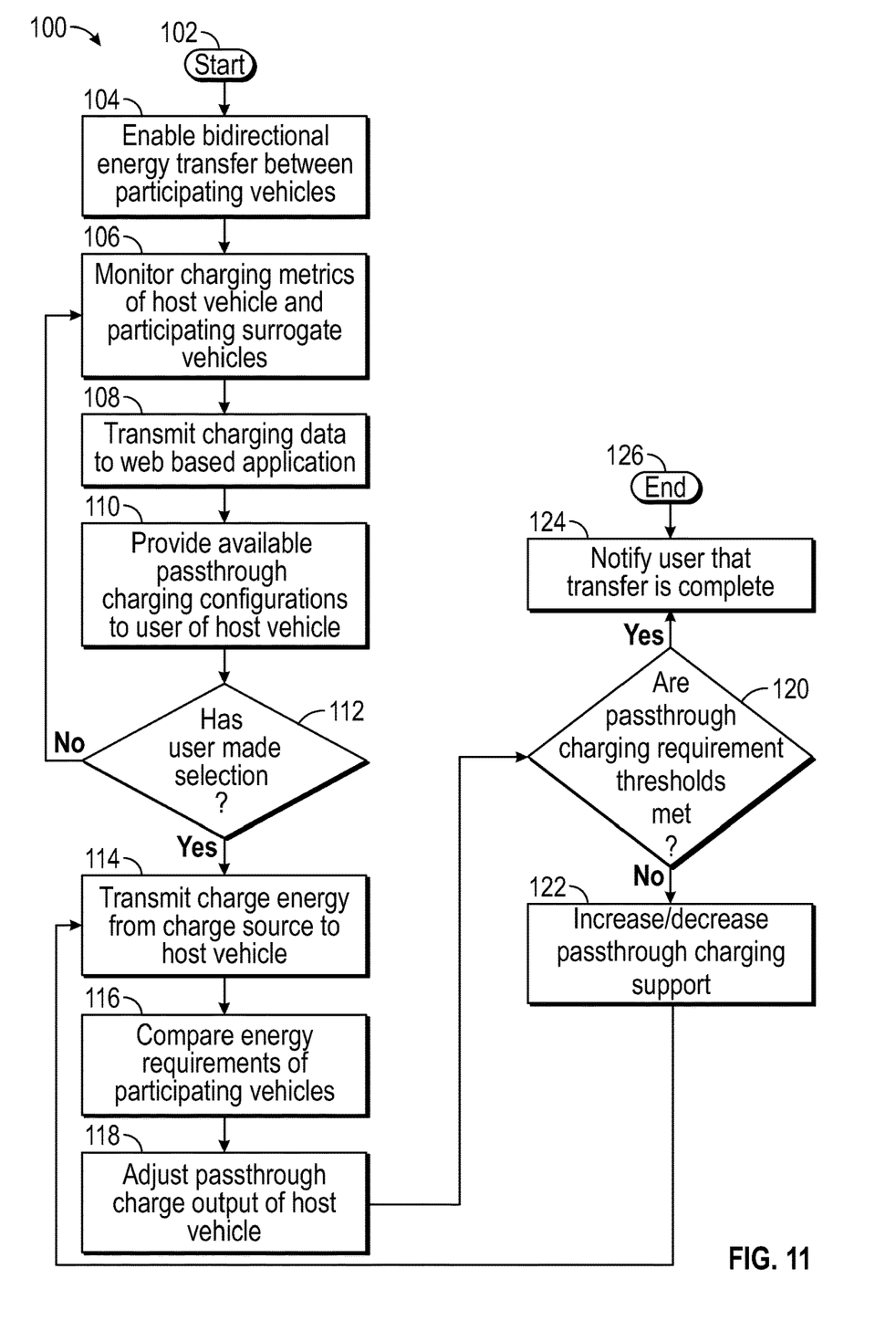
FIG. 11 is a flow chart of an exemplary method for coordinating and providing passthrough charging support during a bidirectional energy transfer event.

FIG. 11, with continued reference to FIGS. 1-10, schematically illustrates in flow chart form an exemplary method 100 for coordinating and providing passthrough charging support during bidirectional energy transfer events, such as between the host vehicle 16 and one or more participating surrogate vehicles 18. The system 10 may be configured to employ one or more algorithms adapted to execute at least a portion of the steps of the exemplary method 100. For example, the method 100 may be stored as executable instructions in the memory 72 of the control module 46, and the executable instructions may be embodied within any computer readable medium that can be executed by the processor 70 of the control module 46. The method 100 could alternatively or additionally be stored as executable instructions in the memories of comparable control modules of each surrogate vehicle 18.

The exemplary method 100 may begin at block 102. The method 100 assumes that the participating vehicles of the system 10 are already connected in series using a plurality of charging cables 32, for example.

At block 104, the method 100 enables the bidirectional energy transfer between participating vehicles of the system 10. This may include coordinating operations of the bidirectional energy transfer system 34 of each participating vehicle in order for allowing passthrough charging to occur during the bidirectional energy transfer event.

Next, at block 106, the method 100 may monitor the charging metrics of both the host vehicle 16 and each participating surrogate vehicle 18. The charging metrics that may be monitored include but are not limited to the charging status of each participating vehicle and battery-related data received from the traction battery packs 20 of each participating vehicle.

The method 100 may transmit all relevant charging data to the application 54/60 at block 108. The method 100 may then provide the available passthrough charging configurations available to the user of the host vehicle 16 at block 110.

The method 100 may determine whether the user has selected one of the passthrough charging configurations at block 112. If YES, the method 100 may proceed to block 114 by transmitting charge energy from the charge source 12 to the host vehicle 16. The charge energy may be transmitted via a wired connection, a wireless connection, or both.

The energy requirements of the host vehicle 16 and each participating surrogate vehicle 18 may be compared at block 116 of the method 100. If necessary, the passthrough charge energy output of the host vehicle 16 may be adjusted at block 118, such as by controlling the bidirectional power transfer system 34 of the host vehicle 16, for example.

At block 120, the method 100 may determine whether the selected passthrough charging requirement thresholds of the participating vehicles have been met. If NO, the method 100 may proceed to block 122 by either increasing or decreasing the passthrough charging support provided by host vehicle 16. If YES, the method 100 may notify the user of the host vehicle 16 that the energy transfer is complete, such as via the HMI 44 and/or the personal electronic device 58, at block 124. The method 100 may end at bock 126.

The bidirectional energy transfer systems of this disclosure are designed to provide passthrough charging support for concurrently charging multiple vehicles from a single charge source. The proposed systems facilitate a more streamlined usage of charging stations during rush hour and other busy charging times. The proposed systems may further promote goodwill and comradery between electrified vehicle owners.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A bidirectional energy transfer system, comprising:
a host vehicle including a first traction battery pack;
a surrogate vehicle including a second traction battery pack,
wherein the surrogate vehicle is operably connected to the host vehicle by a charging cable; and
a control module configured to command that a first amount of charge energy received from a charge source be delivered for charging the first traction battery pack and a second amount of the charge energy be delivered for charging the second traction battery pack during a bidirectional energy transfer event,
wherein the control module is an on-board component of the host vehicle.

2. The system as recited in claim 1, wherein the second amount of the charge energy provides passthrough charging support for charging the surrogate vehicle from the charge source without a direct connection of the surrogate vehicle to the charge source.

3. The system as recited in claim 1, wherein the control module is configured to interface with a bidirectional power transfer system of at least one of the host vehicle or the surrogate vehicle for controlling a transfer of the first amount of the charge energy and the second amount of the charge energy, wherein the control module is further configured to communicate a passthrough charging signal for controlling the bidirectional power transfer system to provide the first amount and the second amount during the transfer.

4. The system as recited in claim 1, comprising a human machine interface or a personal electronic device associated with the host vehicle, wherein the human machine interface, the personal electronic device, or both is configured through a cloud-based application to provide a user interface for selecting a passthrough charging configuration that defines the first amount and the second amount of the charge energy.

5. The system as recited in claim 4, wherein the passthrough charging configuration includes a distributed passthrough charging configuration, a waterfall passthrough charging configuration, a targeted passthrough charging configuration, an automated passthrough charging configuration, or a pay-for-use passthrough charging configuration.

6. The system as recited in claim 1, wherein the first amount of the charge energy is zero and the second amount of the charge energy is an amount greater than zero.

7. The system as recited in claim 1, wherein the host vehicle includes a first charge port assembly operably connected to the charge source and a second charge port assembly operably connected to the charging cable.

8. The system as recited in claim 1, wherein the host vehicle includes a charging splitter adapter operably connected to both the charge source and the charging cable.

9. The system as recited in claim 1, wherein the charge source is a wireless charger module that is configured to wirelessly transfer energy to the host vehicle.

10. The system as recited in claim 9, wherein the control module is further configured to command that a third amount of charge energy received from the surrogate vehicle be delivered for charging the first traction battery pack during the bidirectional energy transfer event.

11. An electrified vehicle, comprising:
a traction battery pack;
a bidirectional power transfer system operably connected to the traction battery pack;
a control module programmed to control the bidirectional power transfer system to provide passthrough charging support for charging a device separate from the electrified vehicle during a bidirectional energy transfer event;
a first charge port assembly operably connected to the bidirectional power transfer system;
a second charge port assembly operably connected to the bidirectional power transfer system;
a first charging cord connected to the first charge port assembly; and
a second charging cord connected to the second charge port assembly,
wherein the second charge port assembly is a separate and distinct component from each of the first charge port assembly, the first charging cord, and the second charging cord.

12. The electrified vehicle as recited in claim 11, comprising a telecommunications module configured for establishing bidirectional communications between the electrified vehicle and a second electrified vehicle.

13. The electrified vehicle as recited in claim 11, comprising a human machine interface or a personal electronic device, wherein the human machine interface, the personal electronic device, or both is configured through a cloud-based application to provide a user interface for selecting a passthrough charging configuration for achieving the passthrough charging support.

14. The electrified vehicle as recited in claim 13, wherein the passthrough charging configuration includes a distributed passthrough charging configuration, a waterfall passthrough charging configuration, a targeted passthrough charging configuration, an automated passthrough charging configuration, or a pay-for-use passthrough charging configuration.

15. The electrified vehicle as recited in claim 13, wherein the user interface is configured to allow a user to enter a specific amount of charge energy or a desired passthrough charging schedule or target to be transferred during the bidirectional energy transfer event.

16. The electrified vehicle as recited in claim 11, wherein the control module is programmed to command that a first amount of charge energy received from a charge source be delivered for charging the traction battery pack and a second amount of the charge energy be delivered for charging the device during the bidirectional energy transfer event.

17. The electrified vehicle as recited in claim 16, wherein the device is a second traction battery pack of a second electrified vehicle, and the second amount provides the passthrough charging support.

18. The electrified vehicle as recited in claim 17, wherein the electrified vehicle and the second electrified vehicle are operably connected to one another by a charging cable.

19. The electrified vehicle as recited in claim 11, wherein the electrified vehicle is a pickup truck, and further wherein the second charge port assembly is located in a truck bed of the pickup truck.

20. An electrified vehicle, comprising:
a traction battery pack;
a bidirectional power transfer system operably connected to the traction battery pack;
a control module programmed to control the bidirectional power transfer system to provide passthrough charging support for charging a second electrified vehicle that is separate from the electrified vehicle during a bidirectional energy transfer event; and
a human machine interface or a personal electronic device, wherein the human machine interface, the personal electronic device, or both is configured through a cloud-based application to provide a user interface for selecting a passthrough charging configuration for achieving the passthrough charging support,
wherein the passthrough charging configuration includes an automated passthrough charging configuration that is based on at least a first planned trip of the electrified vehicle and a second planned trip of the second electrified vehicle.

* * * * *